United States Patent
Kang et al.

(10) Patent No.: US 11,398,774 B2
(45) Date of Patent: Jul. 26, 2022

(54) ELECTRONIC APPARATUS AND CONTROL METHOD THEREOF

(71) Applicant: SAMSUNG ELECTRONICS CO., LTD., Suwon-si (KR)

(72) Inventors: Shinho Kang, Suwon-si (KR); Moonyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/991,415

(22) Filed: Aug. 12, 2020

(65) Prior Publication Data
US 2021/0050772 A1  Feb. 18, 2021

(30) Foreign Application Priority Data
Aug. 14, 2019 (KR) .................. 10-2019-0099889

(51) Int. Cl.
*H02M 1/42* (2007.01)
*H02M 3/158* (2006.01)
*H02M 1/44* (2007.01)

(52) U.S. Cl.
CPC ....... *H02M 1/4208* (2013.01); *H02M 1/4225* (2013.01); *H02M 1/44* (2013.01); *H02M 3/1584* (2013.01)

(58) Field of Classification Search
CPC .... H02M 1/44; H02M 1/4208; H02M 1/4225; H02M 3/1584; H02M 1/42; H02M 3/158
See application file for complete search history.

(56) References Cited

U.S. PATENT DOCUMENTS

| | | | |
|---|---|---|---|
| 8,106,640 B2 | 1/2012 | Itakura | |
| 9,106,136 B2 | 8/2015 | Kris | |
| 9,634,555 B2* | 4/2017 | De Rooij | H02M 1/4225 |
| 10,038,318 B2 | 7/2018 | Price et al. | |
| 2010/0039088 A1* | 2/2010 | Yang | H02M 3/1584 323/288 |
| 2010/0097828 A1* | 4/2010 | Chen | H02M 3/1584 363/72 |
| 2012/0001600 A1* | 1/2012 | Yang | H02M 1/4225 323/207 |

FOREIGN PATENT DOCUMENTS

| | | |
|---|---|---|
| JP | 5431980 | 3/2014 |
| JP | 2018-148766 | 9/2018 |
| KR | 10-2002-0084401 | 11/2002 |
| KR | 10-0954123 | 4/2010 |
| KR | 10-1155620 | 6/2012 |
| KR | 10-2014-0061370 | 5/2014 |
| KR | 10-2015-0116816 | 10/2015 |

* cited by examiner

*Primary Examiner* — Gary L Laxton
(74) *Attorney, Agent, or Firm* — Nixon & Vanderhye P.C.

(57) ABSTRACT

An electronic apparatus is disclosed. The electronic apparatus includes: a first power factor correction (PFC) unit comprising circuitry and a second PFC unit comprising circuitry connected to the first PFC unit, a first controller configured to control the first PFC unit, and a second controller configured to control the second PFC unit, wherein the first controller is configured to: detect a voltage output from the first PFC unit, control a driving time of the first PFC unit based on the detected output voltage, and provide information on the driving time to the second PFC unit through the second controller, and wherein the second controller is configured to control a driving time of the second PFC unit based on the information on the driving time.

18 Claims, 11 Drawing Sheets

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2019-0099889, filed on Aug. 14, 2019, in the Korean Intellectual Property Office, the disclosure of which is incorporated by reference herein in its entirety.

BACKGROUND

1. Field

The disclosure relates to an electronic apparatus and a control method thereof. For example, the disclosure relates to a display apparatus including a plurality of power factor correction (PFC) units and a control method thereof.

2. Description of Related Art

With the recent development of electronic technology, various types of display apparatuses have been developed and distributed, and demand for large display apparatuses is increasing.

In particular, power consumption increases with an increase in the size of the display apparatus, and large display apparatuses use a power sharing method using a plurality of PFC circuits to stably supply high power consumption.

The conventional power sharing method additionally requires a controller that distributes output power in addition to the PFC circuit. Also, the conventional power sharing method requires a PFC circuit capable of providing a high-capacity output power in consideration of a peak frequently generated during a transient state until the power is stably supplied to an internal load of the display apparatus, imbalance of output power, and so on.

Therefore, it is difficult to reduce a weight of a power supply device provided in a display apparatus, thereby increasing manufacturing cost.

SUMMARY

Embodiments of the disclosure provide an electronic apparatus configured to supply power to an internal load through stable power sharing even in an initial transient state of the electronic apparatus, and a control method thereof.

According to an example embodiment of the disclosure, an electronic apparatus includes: a first power factor correction (PFC) unit comprising PFC circuitry and a second PFC unit comprising PFC circuitry connected to the first PFC unit, a first controller configured to control the first PFC unit, and a second controller configured to control the second PFC unit, wherein the first controller is configured to: detect a voltage output from the first PFC unit, control a driving time of the first PFC unit based on the detected output voltage, and provide information on the driving time to the second PFC unit through the second controller, wherein the second controller is configured to control a driving time of the second PFC unit based on the information on the driving time.

According to an example embodiment of the disclosure, a method of controlling an electronic apparatus including a first power factor correction (PFC) unit comprising PFC circuitry, a second PFC unit comprising PFC circuitry connected to the first PFC unit, a first controller configured to control the first PFC unit, and a second controller configured to control the second PFC unit, the method includes: detecting a voltage output from the first PFC unit through the first controller, controlling a driving time of the first PFC unit based on the detected output voltage, providing information on the driving time to the second PFC unit through the second controller and controlling a driving time of the second PFC unit based on the information on the driving time through the second controller.

According to various example embodiments of the disclosure, even in an initial transient state according to an operation of the electronic apparatus, a plurality of low-capacity PFC units are efficiently driven to prevent peak occurrence and unbalance of output power, and to stably supply power to an internal load through power sharing.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the disclosure will be briefly explained, and various example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the example embodiments to a specific embodiment form. Instead, modifications, equivalents and replacements included in the disclosed concept and technical scope of this specification may be employed. While describing example embodiments, if it is determined that the specific description regarding a known technology obscures the gist of the disclosure, the specific description may be omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below. However, example embodiments may be realized in a variety of different configurations, and not limited to descriptions provided herein. Also, well-known functions or constructions may not be described in detail where they would obscure the disclosure with unnecessary detail.

Figure 1:
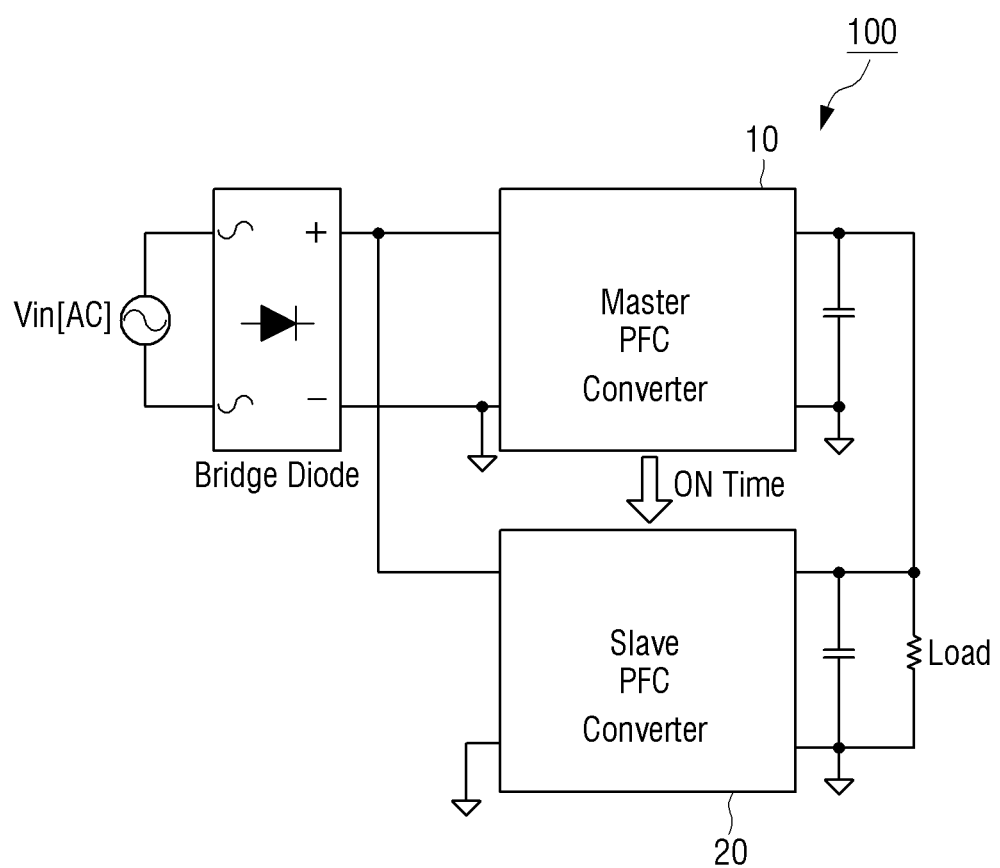
FIG. 1 is a diagram illustrating an example configuration of an example electronic apparatus according to an embodiment of the disclosure.

FIG. 1 is a diagram illustrating an example configuration of an example electronic apparatus according to an embodiment of the disclosure.

As illustrated in FIG. 1, the electronic apparatus 100 according to an embodiment of the disclosure may include a first (e.g., Master) power factor correction (PFC) unit (e.g., including power factor correction circuitry) 10 and a second (e.g., Slave) PFC unit (e.g., including power factor correction circuitry) 20 connected to the first PFC unit 10. The electronic apparatus 100 may refer, for example, to a display apparatus having an image processing function and/or a display function such as, for example, and without limitation, a smartphone, a tablet PC, a notebook PC, a head mounted display (HMD), a near eye display (NED), a large format display (LFD), a digital signage, a digital information display (DID), a video wall, a projector display, a camera, a camcorder, a printer, or the like. However, it is not limited thereto and may refer various types of electronic apparatuses.

According to an embodiment of the disclosure, a power supply (for example, a switched mode power supply (SMPS)) may include power factor correction circuit, that is a PFC unit, to meet an increase in overall power consumption and various regulations caused by an enlargement of the electronic apparatus.

The power supply may, for example, include hardware that converts AC current into DC current, which is stably supplied by an internal load of the electronic apparatus 100. The power supply may roughly include an AC-DC rectifier, a DC-DC switching converter, an output filter, and an outputter. The power supply may provide a stabilized output power to the load by controlling an on-off time ratio of a switch element. The power supply according to an embodiment of the disclosure may include an input electromagnetic interference (EMI) filter unit or the like. As an example, the EMI filter unit may remove electrical noise of a commercial power supply.

The power supply according to an embodiment may include a plurality of PFC units. The plurality of PFC units may be implemented as various types of converters, such as, for example, and without limitation, a buck, a boost, a buck-boost converter, or the like.

In addition, an operation mode may be divided, for example, into a continuous conduction mode (CCM), a critical conduction mode (CRM), and a discontinuous conduction mode (DCM) according to a current waveform of an inductor provided in the PFC unit.

The PFC unit operating in the CCM may include a circuit that maintains continuous features such that there is no moment when a current of the inductor becomes zero. The PFC unit operating in the CCM may keep a current peak and ripple of the inductor low.

For another example, the PFC unit operating in the CrM may include a circuit capable of zero current detection (ZCD), and when a current of the inductor is 0, may turn on a switch to reduce switching loss and current peak value. Hereinafter, for convenience of description, each of a first and second PFC units is assumed as being a CRM PFC circuit capable of zero current switching (ZCS).

The first PFC unit 10 and the second PFC unit 20 connected to the first PFC unit 10 according to an embodiment of the disclosure may supply power to an internal load of the electronic apparatus 100 through power sharing to perform the electronic apparatus 100. For example, an output power of the first and second PFC units may correspond to a half of total power consumption of the electronic apparatus 100, respectively. However, this is an embodiment, and each of the first PFC unit 10 and the second PFC unit 20 may provide output power according to a preset ratio to a load.

Hereinafter, various example embodiments of providing power to an internal load of the electronic apparatus 100 through power sharing between a plurality of PFC units will be described in greater detail below.

Figure 2:
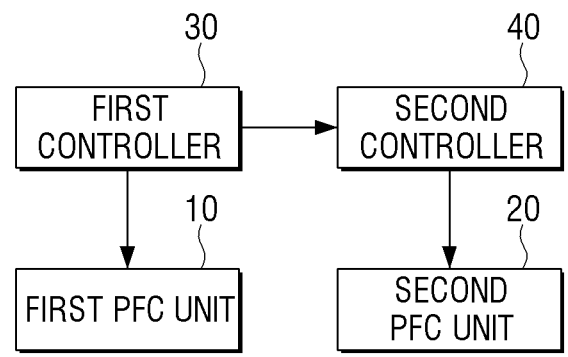
FIG. 2 is a block diagram illustrating an example configuration of an electronic apparatus according to an embodiment of the disclosure.

FIG. 2 is a block diagram illustrating an example configuration of an example electronic apparatus according to an embodiment of the disclosure.

Referring to FIG. 2, the electronic apparatus 100 includes a first PFC unit (e.g., including PFC circuitry) 10, a second PFC unit (e.g., including PFC circuitry) 20, a first controller (e.g., including processing and/or controlling circuitry) 30, and a second controller (e.g., including processing and/or controlling circuitry) 40.

According to an embodiment of the disclosure, the first PFC unit 10 and the first controller 30 may be connected to each other. In addition, the second PFC unit 20 and the second controller 40 may be connected to each other.

Each of the first controller 30 and the second controller 40 may be implemented as a separate IC chip including a circuit. For example, the first controller 30 may be connected to the first PFC unit 10 using a specific terminal (or pin) on the first controller 30 and control the first PFC unit 10. Also, the second controller 40 may be connected to the second PFC unit 20 using a specific terminal on the second controller 40 and control the second PFC unit 20.

According to an embodiment of the disclosure, the first controller 30 may detect a voltage output from the first PFC unit 10. The first controller 30 may control a driving time of the first PFC unit 10 based on the detected output voltage. The voltage output from the first PFC unit 10 may refer, for example, to a feedback voltage. The first controller 30 according to an embodiment may be connected to the first PFC unit 10 and 30 to detect the voltage output from the first PFC unit 10, and identify the detected output voltage as a feedback voltage.

The first controller 30 may control the driving time of the first PFC unit 10 based on the detected output voltage (or feedback voltage). The driving time may refer, for example, to a time that turns on a MOSFET (or switch, MOS transistor) provided in the first PFC unit 10.

According to an embodiment, an on/off operation of the MOSFET provided in the first PFC unit 10 may be controlled according to a control signal output from the first controller 30.

The first PFC unit 10 may accumulate an energy of an input DC voltage when the MOSFET is on, and output the accumulated energy when the MOSFET is off.

The first controller 30 and the second controller according to an embodiment of the disclosure may, for example, be connected to each other through a specific terminal and a signal line. The first controller 30 according to an embodiment may provide information on the driving time of the first PFC unit 10 to the second controller 40. The second controller 40 may control a driving time of the second PFC unit 20 based on information on the driving time provided from the first controller 30.

For example, the information on the provided driving time may include information on an on-time of the MOSFET provided in the first PFC unit 10. The second controller 40 may control an on-time of the MOSFET provided in the second PFC unit 20 based on information on the provided driving time. A more detailed description thereof will be described below with reference to FIG. 3.

Figure 3:
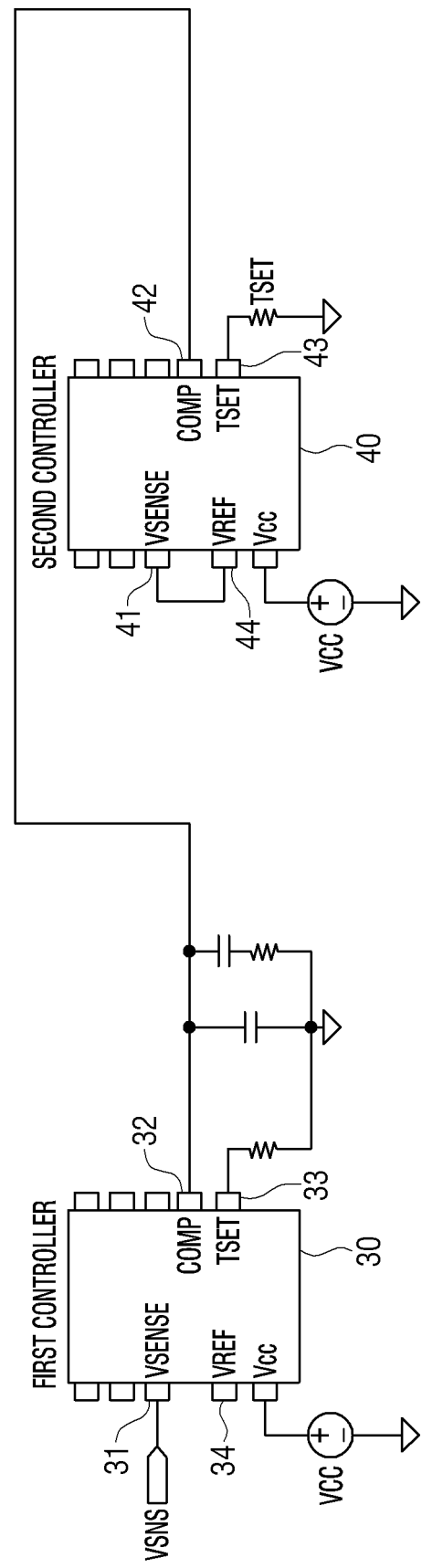
FIG. 3 is a diagram illustrating an example controller according to an embodiment of the disclosure.

FIG. 3 is a diagram illustrating an example controller according to an embodiment of the disclosure.

Referring to FIG. 3, each of the first controller 30 and the second controller 40 may be implemented as a circuit including a plurality of terminals (or pins).

The first controller 30 according to an embodiment may include a terminal 31 that detects an output voltage, an output terminal 32, a timing set terminal 33, and a reference output voltage terminal 34.

The first controller 30 may detect an output voltage of the first PFC unit 10 based on a signal received by the terminal 31 detecting the output voltage connected to the first PFC unit 10. The first controller 30 may control the driving time of the first PFC unit 10 based on the detected output voltage. For example, the first controller 30 may control a voltage level of the output terminal 32 of the first controller 30 based on the detected output voltage. The voltage level of the output terminal 32 may be proportional to the driving time of the first PFC unit 10, for example, the on-time of the MOSFET. The first controller 30 may control the driving time of the first PFC unit 10 based on the voltage level of the output terminal 32. The output terminal 32 may be referred to as a comp terminal, an error amplifier output terminal, etc., but, hereinafter, for convenience of description, it will be collectively referred to as an output terminal 32.

Referring to FIG. 3, the second controller 40 may include a terminal 41 that detects an output voltage, an input terminal 42, a timing set terminal 43, and a reference output voltage terminal 44.

The input terminal 42 of the second controller 40 may be connected to the output terminal 32 of the first controller 30. Accordingly, a voltage level equal to the voltage level of the output terminal 32 of the first controller 30 may be applied to the input terminal 42 of the second controller 40.

The second controller 40 may control the driving time of the second PFC unit 20 based on a voltage level of the input terminal 42. According to an embodiment, when the voltage level of the output terminal 32 of the first controller 30 and the voltage level of the input terminal 42 of the second controller 40 are the same, an on-time of a MOSFET of the first PFC unit 10 and an on-time of a MOSFET of the second PFC unit 20 may be the same. The output voltage of the first PFC unit 10 and the output voltage of the second PFC unit 20 may be the same.

The first controller 30 of the disclosure may include a first resistance. Referring to FIG. 3, a first resistance may be connected to the timing set terminal 33 of the first controller 30. The first controller 30 may control the driving time of the first PFC unit 10 based on a magnitude of a first resistance and the voltage level of the output terminal 32. According to an embodiment, the first controller 30 may control the driving time of the first PFC unit 10 in proportion to the magnitude of the first resistance connected to the timing set terminal 33 of the first controller 30. A more detailed description thereof will be described below with reference to FIG. 4.

Figure 4:
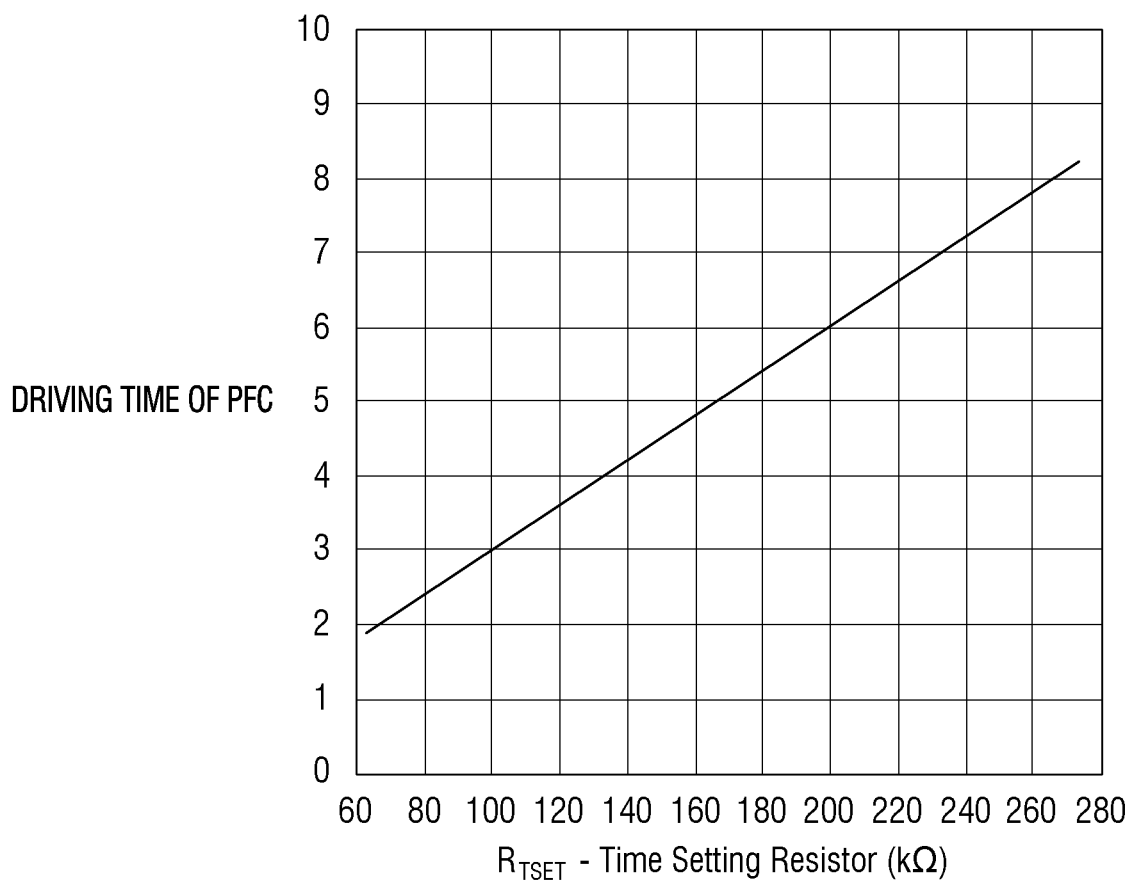
FIG. 4 is a graph illustrating example resistance provided in a controller according to an embodiment of the disclosure.

FIG. 4 is a graph illustrating example resistance provided in a controller according to an embodiment of the disclosure.

Referring to a graph of FIG. 4, a driving time of the first PFC unit 10 increases in proportion to the magnitude of the first resistance connected to the timing set terminal 33 of the first controller 30.

Accordingly, the driving time of the first PFC unit 10 may be represented by Equation 1 below.

$$T_{ON} = K_{TSET} * V_{COMP} * R_{TSET} \qquad \text{[Equation 1]}$$

$T_{ON}$ refers to an on-time of the MOSFET of the first PFC unit 10, $K_{TSET}$ refers to a constant, $V_{COMP}$ refers to a voltage level of the output terminal 32 of the first controller 30, $R_{TSET}$ refers to a magnitude of the first resistance connected to the timing set terminal 33.

According to Equation 1, variables affecting the on-time of the MOSFET of the first PFC unit 10 may be the voltage level of the output terminal 32 of the first controller 30 and the magnitude of the first resistance connected to the timing set terminal 33 of the first controller 30.

For convenience of description, Equation 1 is limited to the first PFC unit 10, but $T_{ON}$ according to Equation 1 may refer to the on-time of the MOSFET of the second PFC unit 20.

According to an embodiment, variables affecting the on-time of the MOSFET of the second PFC unit 20 may include, for example, the voltage level of the input terminal 42 of the second controller 40 and the magnitude of the second resistance connected to the timing set terminal 43 of the second controller 40. For example, if the voltage level of the output terminal 32 of the first controller 30 and the voltage level of the input terminal 42 of the second controller 40 are the same, and if the magnitude of the first resistance connected to the timing set terminal 33 of the first controller 30 and the magnitude of the second resistance connected to the timing set terminal 43 of the second controller 40 are the same, the output voltage of the first PFC unit 10 and the output voltage of the second PFC unit 20 may be the same.

According to another embodiment, the $K_{TSET}$ may be a capacity value of an internal configuration and an internal element of the controller, or a variable value according to the magnitude of the first resistance connected to the timing set terminal 33 of the first controller 30. For example, $K_{TSET}$ may be expressed by Equation 2 below.

$$K_{TSET} = \frac{R_{TSET}}{133\ \text{Kohm}} [\mu s/V] \qquad \text{[Equation 2]}$$

$R_{TSET}$ refers to a magnitude of the first resistance connected to the timing set terminal 33 of the first controller 30. The driving time of the first PFC unit 10 may be expressed by Equation 3 below.

$$T_{ON} = K_{TSET} * (V_{COMP} - 125\ \text{mV}) \qquad \text{[Equation 3]}$$

$T_{ON}$ refers to the $_{ON}$ time of the MOSFET of the first PFC unit 10, and $V_{COMP}$ refers to a voltage level of the output terminal 32 of the first controller 30. Specific numbers of Equations 2 and 3 are merely dependent and fixed values according to capacities of internal elements configuring the controller and the PFC unit, and are not limited thereto.

Figure 5:
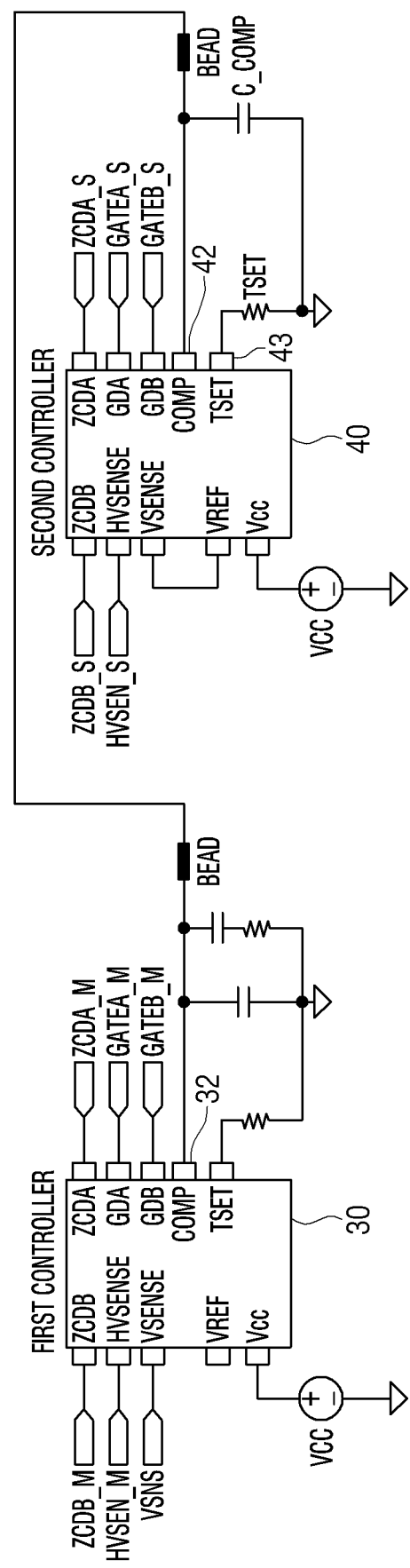
FIG. 5 is a diagram illustrating an example controller according to an embodiment of the disclosure.

FIG. 5 is a diagram illustrating an example controller according to an embodiment of the disclosure.

Referring to FIG. 5, the second controller 40 according to an embodiment of the disclosure may include a filter connected to an input terminal 43. According to an embodiment, the filter may remove noise generated according to an on of MOSFET of at least one of the first PFC unit 10 or the second PFC unit 20. In addition, the filter may perform filtering of noise that may cause an abnormal operation of the first controller 30 or the second controller 40.

The filter according to an embodiment may include at least one inductor and a capacitor. For example, the filter may include a low pass filter (LPF) including a bead and a condenser. The bead may remove high-frequency noise, and condenser, which is a multi-layer ceramic capacitor (MLCC), may remove noise in the PFC unit.

The magnitude of the second resistance connected to the timing set terminal 43 of the second controller 40 may be variable according to an embodiment of the disclosure.

According to an embodiment, the second controller 40 may change the magnitude of the second resistance to compensate for a voltage drop generated by the filter connected to the input terminal 43.

For example, the voltage drop generated by the filter causes a difference between the voltage level of the output terminal 32 of the first controller 30 and the voltage level of the input terminal 42 of the second controller 40. The magnitude of the second resistance may be determined based on a difference between the voltage level of the output terminal 32 of the first controller 30 and the voltage level of the input terminal 42 of the second controller 40. A more detailed description thereof will be described below with reference to FIG. 6.

Figure 6:
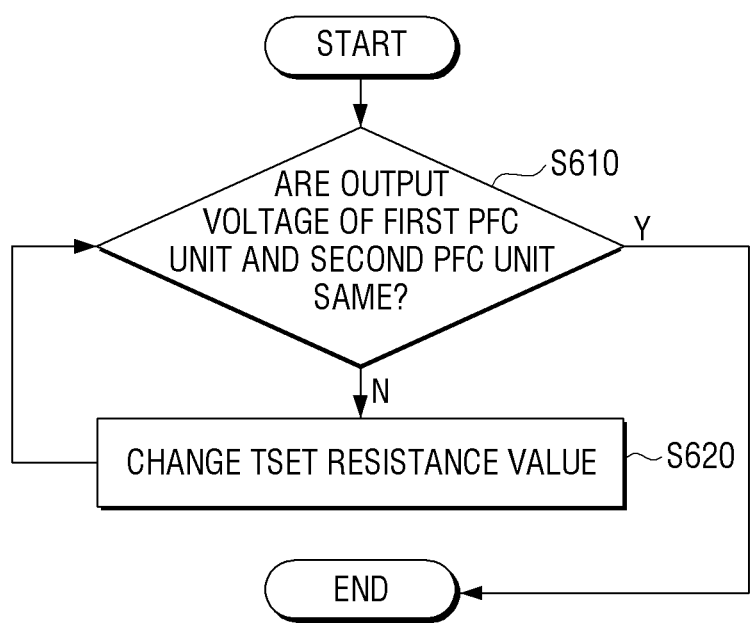
FIG. 6 is a flowchart illustrating an example operation of providing a resistance in controller according to an embodiment of the disclosure.

FIG. 6 is a flowchart illustrating example resistance provided in a controller according to an embodiment of the disclosure.

As for a method of determining the magnitude of the second resistance, it may be determined whether an output voltage of each of the first PFC unit 10 and the second PFC unit 20 is the same (S610). When the output voltages of the first PFC unit 10 and the second PFC unit 20 are not the same ("N" in operation S610), the magnitude of the second resistance is changed (S620). For example, when the magnitude of the first resistance connected to the first controller 30 is 100 Kohm, the magnitude of the second resistance may be determined to have a value of 0.1 to 1% greater than the magnitude of the first resistance.

According to an embodiment, an output voltage level of the second PFC unit 20 is proportional to the voltage level of the input terminal 42 of the second controller 40 and the magnitude of the second resistance connected to the timing set terminal 43 of the second controller 40. When the magnitude of the second resistance is set greater than the magnitude of the first resistance, voltage drop due to the filter may be compensated, and the output voltage level of the second PFC unit 20 may be equal to the output voltage level of the first PFC unit 10.

The magnitude of the second resistance may be set to minimize and/or reduce a difference between the voltage level of the output terminal 32 and the voltage level of the input terminal 42 due to the voltage drop generated by the filter according to a predetermined experimental result in a manufacturing stage of the electronic apparatus 100.

Figure 7:
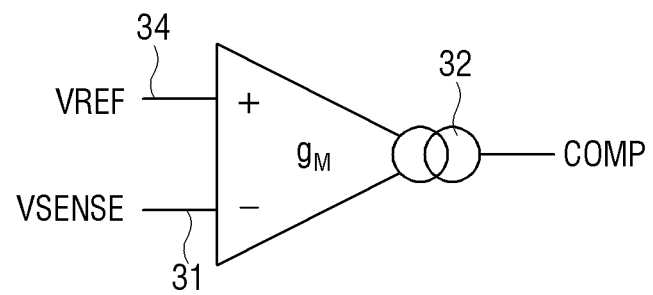
FIG. 7 is a diagram illustrating an example output terminal of a controller according to an embodiment of the disclosure.

FIG. 7 is a diagram illustrating an example output terminal of a controller according to an embodiment of the disclosure.

Referring to FIG. 7, the first controller 30 may identify a voltage level of the output terminal 32 based on a difference between the output voltage of the first PFC unit 10 detected through the terminal 31 detecting the output voltage and a reference output voltage according to the reference output voltage terminal 34.

For example, as illustrated in FIG. 7, the first controller 30 may include a voltage-error amplifier. The first controller 30 may identify a voltage level of the output terminal 32 through the amplifier based on the difference between the output voltage of the first PFC unit 10 and the reference output voltage. For example, as the difference between the output voltage of the first PFC unit 10 and the reference output voltage increases, the voltage level of the output terminal 32 may increase. Since the driving time of the first PFC unit 10 is proportional to the voltage level of the output terminal 32, the first controller 30 may control the driving time of the first PFC unit 10 based on the voltage level of the identified output terminal 32.

According to an embodiment of the disclosure, the second controller 40 may also include a voltage-error amplifier. The terminal detecting an output voltage of the second controller 40 according to an embodiment may be connected to the reference output voltage terminal 44 rather than the second PFC unit 20. Since the second controller 40 identifies that the output voltage of the second PFC unit 20 is the same as the reference output voltage, the second controller 40 may not output a signal through the voltage-error amplifier.

Accordingly, the second controller 40 may not generate a signal for controlling the second PFC unit 20 by itself or control the voltage level of the input terminal 42 by itself. The second controller 40 may control the driving of the second PFC unit 20 based on information on the driving time of the first PFC unit 10 received from the first controller 30. For example, the voltage level of the input terminal 42 of the second controller 40 may be varied depending on the voltage level of the output terminal 32 of the first controller 30.

Figure 8:
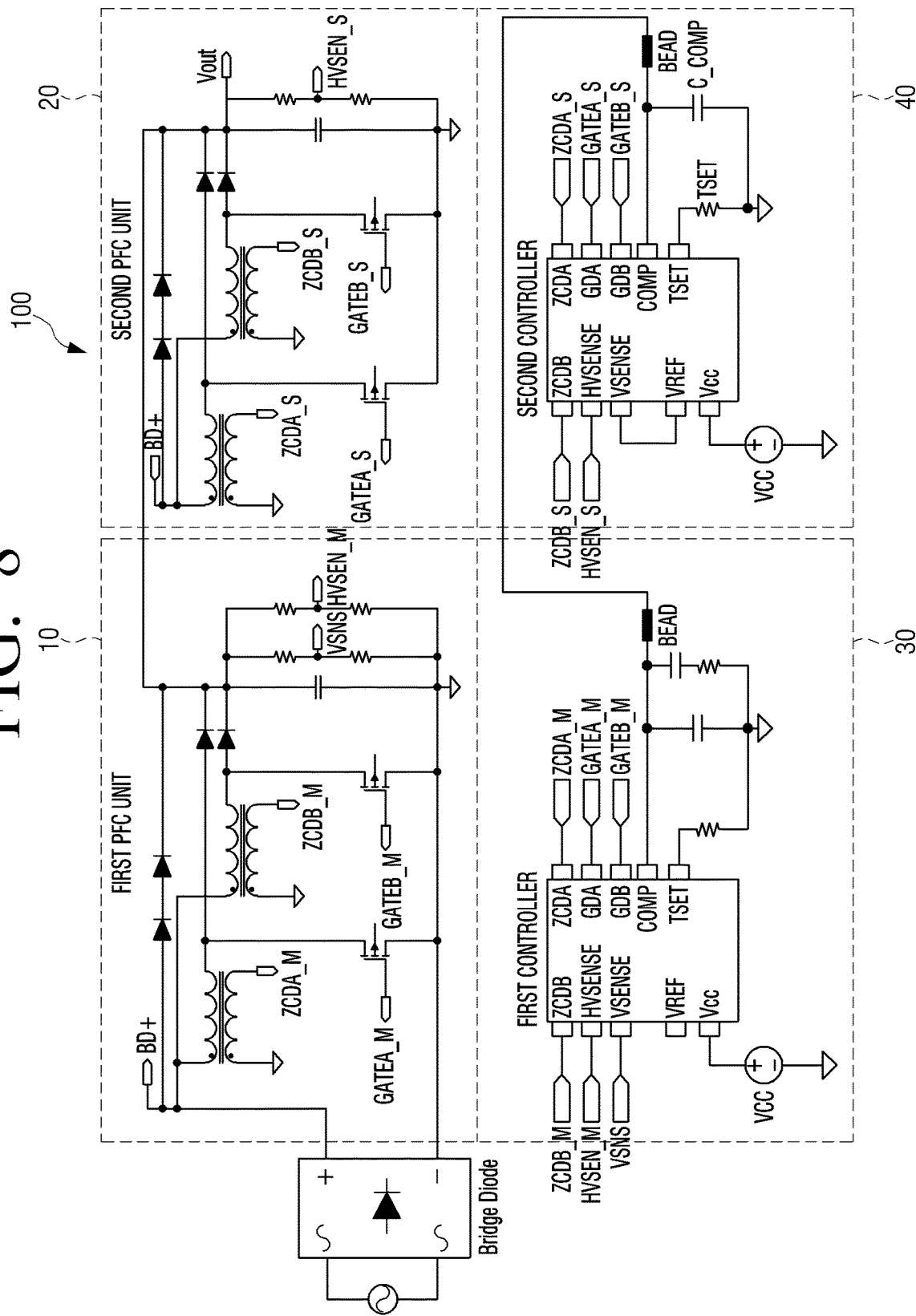
FIG. 8 is a diagram illustrating an example PFC unit and a controller according to an embodiment of the disclosure.

FIG. 8 is a diagram illustrating a PFC unit and a controller according to an embodiment of the disclosure.

Referring to FIG. 8, the electronic apparatus 100 may include a first PFC unit 10 and a second PFC unit 20 connected to the first PFC unit. The first controller 30 for controlling the first PFC unit 10 may be connected to the first PFC unit 10. The second controller 40 for controlling the second PFC unit 20 may be connected to the second PFC unit 20.

For example, the first controller 30 may detect the output voltage of the first PFC unit 10 and may be connected to the second controller 40. The second controller 40 may not detect the output voltage of the second PFC unit 20, and may control a driving time of the second PFC unit 20 based on information received from the first controller 30 rather than the output voltage of the second PFC unit 20. The driving time may refer to an on time of the MOSFET included in the PFC unit.

Each of the first controller 30 and the second controller 40 according to an embodiment of the disclosure may make driving of the first PFC unit 10 and the second PFC unit 20 stop when the output voltage of each of the first PFC unit 10 and the second PFC unit 2 exceeds a threshold value.

For example, the first controller 30 may identify whether the output voltage exceeds a threshold value according to over voltage protection (OVP) of the first PFC unit 10 to protect the first PFC unit 10. When the output voltage of the first PFC unit 10 exceeds a threshold value, the first controller 30 may stop driving of the first PFC unit 10. The threshold value may be variously set according to the configuration of the first PFC unit 10, specification, capacity, or the like of internal elements. In addition, the second controller 40 may also identify whether the output voltage exceeds a threshold value according to over voltage protection (OVP) of the second PFC unit 40 to protect the second PFC unit 40. For example, referring to FIG. 8, the second controller 40 may include a terminal of a high voltage output sense (HVSEN), and control whether the second PFC 20 is driven by identifying whether the output voltage exceeds the threshold value.

In addition, according to an embodiment of the disclosure, the second controller 40 may operate the second PFC unit 20 within a threshold time after the first PFC unit 10 is operated based on the received information on the driving time of the first PFC unit 10. For example, the second controller 40 may operate the second PFC unit 20 at the same time the information is received.

Since the second PFC unit 20 is driven dependent on the driving time of the first PFC unit 10, the first PFC unit 10 may be referred to as a master PFC unit, and the second PFC unit 20 may be referred to as a slave PFC unit.

According to an embodiment of the disclosure, an output power of the first PFC unit 10 and an output power of the second PFC unit 20 may be provided as an internal load of the electronic apparatus 100 to drive the electronic apparatus 100. According to an embodiment, the output power of each of the first PFC unit 10 and the second PFC unit 20 may correspond to a half of total power consumption of the electronic apparatus 100, respectively.

Figure 9:
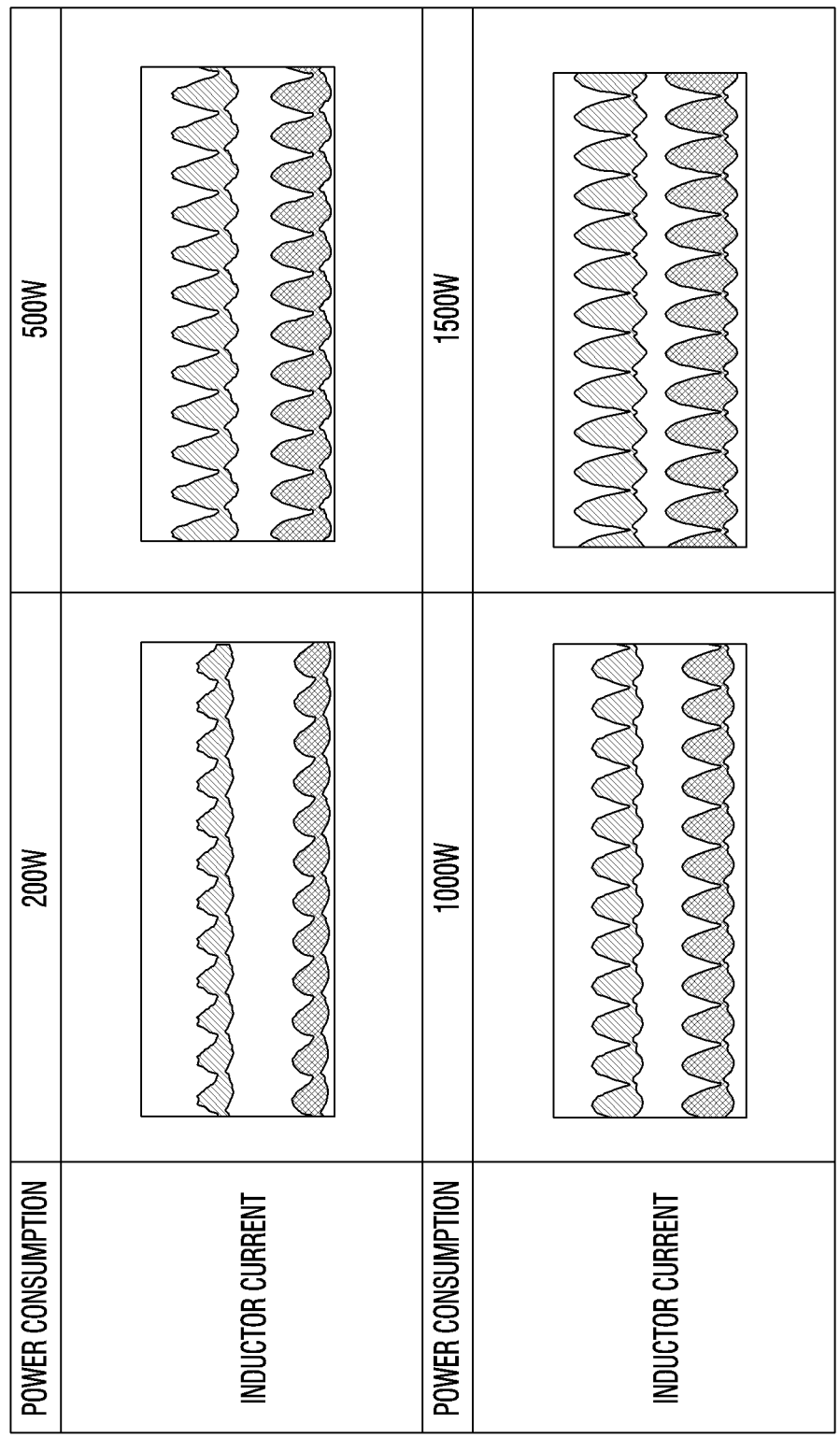
FIG. 9 is a diagram illustrating example PFC unit driving for each power consumption according to an embodiment of the disclosure.

FIG. 9 is a diagram illustrating an example PFC unit driving for each power consumption according to an embodiment of the disclosure.

Referring to FIG. 9, a graph describing a waveform of an inductor current for each output power of each of the first PFC unit 10 and the second PFC unit 20 is illustrated.

Waveforms described at the top of each graph illustrate a waveform of an inductor current of the first PFC unit 10, and waveforms described at the bottom of each graph illustrate a waveform of an inductor current of the second PFC unit 20.

When each of the first and second PFC units 10 and 20 according to an embodiment of the disclosure provides 200 W power to an internal load of the electronic apparatus 100, a waveform of the inductor current of the first PFC unit 10 and a waveform of the inductor current of the second FPC unit 20 may be similar.

While the electronic apparatus 100 is being operated, the output power of either the first or second PFC units 10 and 20 may not exceed a threshold value, and each of the first and second PFC units 10 and 20 may stably output similar power within a threshold range.

Even when a total power consumption of the electronic apparatus 100 increases to 1 kW and 1.5 kW, the output powers of the first and second PFC units 10 and 20 may be similar, any one of the first and second PFC units 10 and 20 may not output power greater than the threshold value, and PEAK may not occur.

Figure 10:
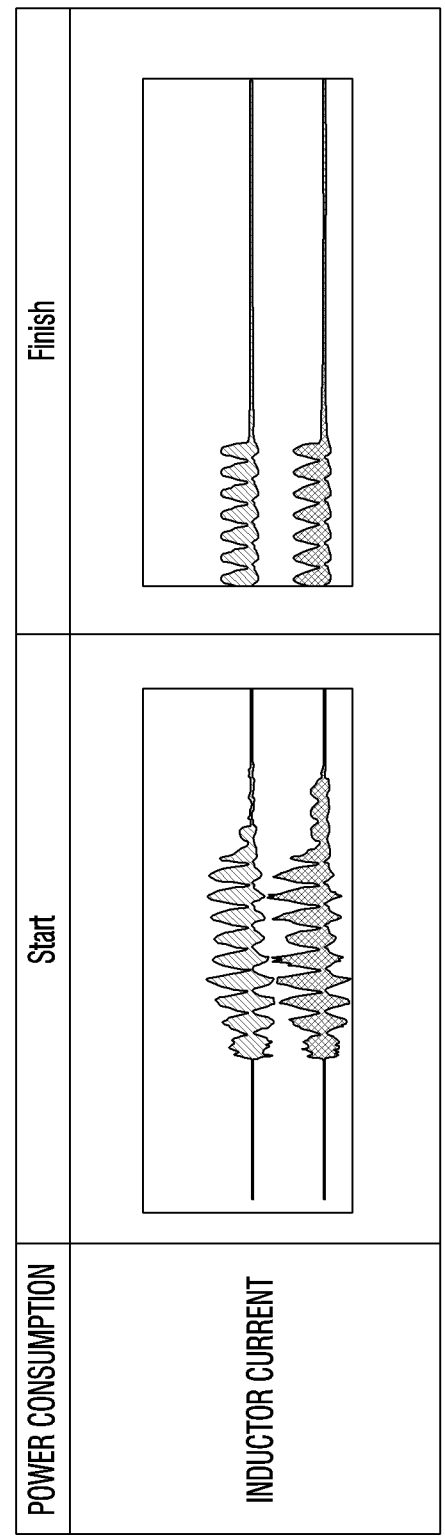
FIG. 10 is a diagram illustrating an example current waveform in a transient state of a PFC unit according to an embodiment of the disclosure.

FIG. 10 is a diagram illustrating an example current waveform in a transient state of a PFC unit according to an embodiment of the disclosure.

The conventional power sharing method additionally required a controller that distributes output power in addition to a PFC unit. Since the controller detects the output power of the PFC unit and distributes the corresponding output power, tens of milliseconds to hundreds of milliseconds were required from an initial transient state to a normal state. There was a problem in that a high-capacity inductor should be provided to prevent a failure of the PFC unit even in a peak state which frequently occurs in the initial transient state.

According to an embodiment of the disclosure, an additional controller for distributing output power is not required, and the peak does not occur even in an initial transient state.

Referring to FIG. 10, the waveform located at the top of each graph refers to a waveform of an inductor current of the first PFC unit 10, and the waveform located at the bottom of each graph refers to a waveform of an inductor current of the second PFC unit 20. The waveform of the inductor current of the first PFC unit 10 in the initial transient driving state of the electronic apparatus 100 is illustrated, and the waveform located at the bottom may be similar to the waveform of the inductor current of the second PFC unit 20.

Even when the driving of the electronic apparatus 100 is stopped, the waveform of the inductor current of the first PFC unit 10 and the waveform of the inductor current of the second PFC unit 20 are similarly changed. In other words, according to various embodiments of the disclosure, power sharing using a plurality of PFC units is available even without having a high-capacity inductor since the peak does not occur even in a transient state.

Figure 11:
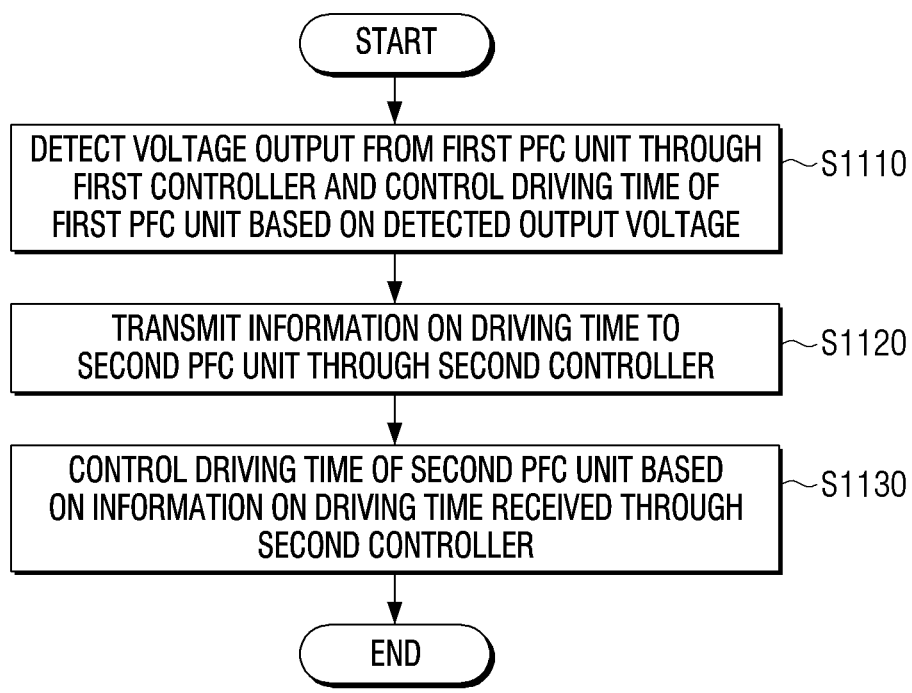
FIG. 11 is a flowchart illustrating an example method of controlling an electronic apparatus according to an embodiment of the disclosure.

FIG. 11 is a flowchart illustrating an example method of controlling an electronic apparatus according to an embodiment of the disclosure.

A method of controlling an electronic apparatus, according to an embodiment of the disclosure, including a first power factor correction (PFC) unit, a second PFC unit connected to the first PFC unit, a first controller controlling the first PFC unit, and a second controller controlling the second PFC unit may detect a voltage output from the first PFC unit through the first controller, and control a driving time of the first PFC unit based on the detected output voltage (S1110).

Information on a driving time is provided to the second PFC unit through the second controller (S1120).

The driving time of the second PFC unit may be controlled based on the information on the driving time provided through the second controller (S1130).

The operation of S1110 that controls the driving time of the first PFC unit may include controlling a voltage level of an output terminal of the first controller based on the detected output voltage and controlling the driving time of the first PFC unit based on the voltage level of the output terminal.

According to an embodiment of the disclosure, an input terminal of the second controller may be connected to the output terminal of the first controller, and the operation of S1130 that controls the driving time of the second PFC unit may control a driving time of the second PFC unit based on a voltage level of the input terminal.

According to an example embodiment, the first controller may include a first resistance, the second controller may include a second resistance, and the operation of S1110 that controls the driving time of the first PFC unit may control the driving time of the first PFC unit based on a magnitude of the first resistance and the voltage level of the output terminal, and the operation of S 1130 that controls the driving time of the second PFC unit may control the driving time of the second PFC unit based on a magnitude of the second resistance and the voltage level of the input terminal.

The second controller may include a filter connected to the input terminal, and the magnitude of the second resistance may be determined based on a difference between the voltage level of the output terminal and the voltage level of the input terminal due to the voltage drop generated by the filter.

The filter may be a low-pass filter (LPF) including a bead and a condenser.

The operation of S1130 that controls the driving time of the second PFC unit may drive the second PFC unit within a threshold time after the first PFC unit is driven based on information on the driving time.

The operation of S1110 that controls the driving time of the first PFC unit may control the driving time of the first PFC unit based on the difference between the detected output voltage and a reference output voltage.

The second controller may include a terminal which detects the output voltage of the second PFC unit and a reference output voltage terminal connected to the terminal which detects the output voltage, and the operation of S1130 that controls the driving time of the second PFC unit may identify that the output voltage of the second PFC unit is similar to the reference output voltage, and control the second PFC unit based on the received driving time of the first PFC unit.

Various embodiments of the disclosure may be applied to all types of electronic apparatuses including a power supply.

Various example embodiments described above may be embodied in a recording medium that may be read by a computer or a similar apparatus to the computer using software, hardware, or a combination thereof. In some cases, the embodiments described herein may be implemented by the processor itself. In a software configuration, various embodiments described in the specification such as a procedure and a function may be embodied as separate software modules. The software modules may respectively perform one or more functions and operations described in the specification.

Computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the electronic apparatus 100 according to the various embodiments described above when executed by the processor of the particular device.

The non-transitory computer-readable medium may refer, for example, to a medium that semi-permanently stores data and is available of reading by the device. For example, the non-transitory computer-readable medium may include a CD, a DVD, a hard disc, Blu-ray disc, USB, a memory card, ROM, or the like.

The foregoing example embodiments and advantages are merely examples and are not to be understood as limiting the disclosure. The disclosure can be readily applied to other types of apparatuses. The description of the example embodiments is intended to be illustrative, and not to limit the scope of the claims, and many alternatives, modifications, and variations falling within the scope of the disclosure will be apparent to those skilled in the art.

What is claimed is:

1. An electronic apparatus comprising:
   a first power factor correction (PFC) unit comprising circuitry and a second PFC unit comprising circuitry connected to the first PFC unit;
   a first controller configured to control a first switch and a second switch in the first PFC unit; and
   a second controller configured to control a third switch and a fourth switch in the second PFC unit,
   wherein the first controller is configured to: detect a voltage output from the first PFC unit, control a driving time of the first switch and the second switch in the first PFC unit based on the detected output voltage, and provide information on the driving time of the first switch and the second switch in the first PFC unit to the second PFC unit via the second controller, and
   wherein the second controller includes: a second controller terminal configured to detect a voltage output from the second PFC unit; and a reference output voltage terminal connected to the second controller terminal,
   wherein the second controller is configured to: identify whether the voltage output by the second PFC unit is the same as a reference voltage, and control a driving time of the third switch and the fourth switch in the second PFC unit based at least on the information on the driving time of the first PFC unit.

2. The apparatus of claim 1, wherein the first controller is configured to: control a voltage level of an output terminal of the first controller based on the detected output voltage, and control the driving time of the first PFC unit based on the voltage level of the output terminal.

3. The apparatus of claim 2, wherein an input terminal of the second controller is connected to the output terminal of the first controller, and
   wherein the second controller is configured to control the driving time of the second PFC unit based on a voltage level of the input terminal.

4. The apparatus of claim 3, wherein the first controller includes a first resistance, and is configured to control the driving time of the first PFC unit based on a magnitude of the first resistance and the voltage level of the output terminal, and
   wherein the second controller includes a second resistance and is configured to control the driving time of the second PFC unit based on a magnitude of the second resistance and the voltage level of the input terminal.

5. The apparatus of claim 4, wherein the second controller includes a filter connected to the input terminal, and wherein the magnitude of the second resistance is determined based on a difference between the voltage level of the output terminal and the voltage level of the input terminal based on a voltage drop generated by the filter.

6. The apparatus of claim 5, wherein the filter comprises a low pass filter (LPF) including a bead and a condenser.

7. The apparatus of claim 1, wherein the second controller is configured to drive the second PFC unit within a threshold time after the first PFC unit is driven based on the information on the driving time of the first PFC unit.

8. The apparatus of claim 1, wherein the first controller is configured to control the driving time of the first PFC unit based on a difference between the detected output voltage and a reference output voltage.

9. The apparatus of claim 1, wherein the output voltage of the first PFC unit and the output voltage of the second PFC unit are the same,
wherein an output power of the first and second PFC units corresponds to a half of total power consumption of the electronic apparatus, respectively.

10. The apparatus of claim 1, wherein each of the first and second controllers is configured to stop driving of the first and second PFC units, respectively, based on the output voltage of each of the first and second PFC units exceeding a threshold value.

11. A method of controlling an electronic apparatus comprising a first power factor correction (PFC) unit comprising circuitry, a second PFC unit comprising circuitry connected to the first PFC unit, a first controller configured to control a first switch and a second switch in the first PFC unit, and a second controller configured to control a third switch and a fourth switch in the second PFC unit, the method comprising:
detecting a voltage output from the first PFC unit through the first controller;
controlling a driving time of the first switch and the second switch in the first PFC unit based on the detected output voltage;
providing information on the driving time of the first switch and the second switch in the first PFC unit to the second PFC unit via the second controller;
detecting, by a second controller terminal included in the second controller, a voltage output from the second PFC unit;
identifying whether the voltage output by the second PFC unit is the same as a reference voltage;
controlling a driving time of the third switch and the fourth switch in the second PFC unit based on information on the received driving time of the first PFC unit, and
wherein the second controller includes: the second controller terminal configured to detect the voltage output from the second PFC unit; and the reference output voltage terminal connected to the second controller terminal.

12. The method of claim 11, wherein the controlling the driving time of the first PFC unit comprises:
controlling a voltage level of an output terminal of the first controller based on the detected output voltage; and
controlling the driving time of the first PFC unit based on the voltage level of the output terminal.

13. The method of claim 12, wherein an input terminal of the second controller is connected to the output terminal of the first controller, and
wherein the controlling the driving time of the second PFC unit comprises controlling the driving time of the second PFC unit based on a voltage level of the input terminal.

14. The method of claim 13, wherein the first controller includes a first resistance,
wherein the second controller includes a second resistance,
wherein the controlling the driving time of the first PFC unit comprises controlling the driving time of the first PFC unit based on a magnitude of the first resistance and the voltage level of the output terminal, and
wherein the controlling the driving time of the second PFC unit comprises controlling the driving time of the second PFC unit based on a magnitude of the second resistance and the voltage level of the input terminal.

15. The method of claim 14, wherein the second controller includes a filter connected to the input terminal, and
wherein the magnitude of the second resistance is determined based on a difference between the voltage level of the output terminal and the voltage level of the input terminal based on a voltage drop generated by the filter.

16. The method of claim 15, wherein the filter comprises a low pass filter (LPF) including a bead and a condenser.

17. The method of claim 11, wherein the controlling the driving time of the second PFC unit comprises: driving the second PFC unit within a threshold time after the first PFC unit is driven based on the information on the driving time of the first PFC unit.

18. The method of claim 11, wherein the controlling the driving time of the first PFC unit comprises: controlling the driving time of the first PFC unit based on a difference between the detected output voltage and a reference output voltage.

* * * * *